March 1, 1966  J. H. MacKAY  3,237,919
COIL SPRING COMPRESSOR
Filed Nov. 20, 1961  2 Sheets-Sheet 2
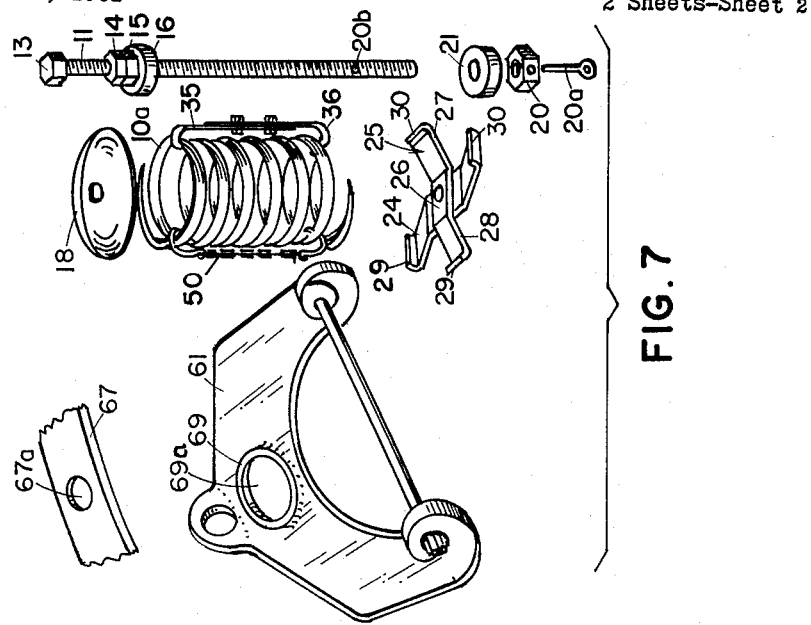
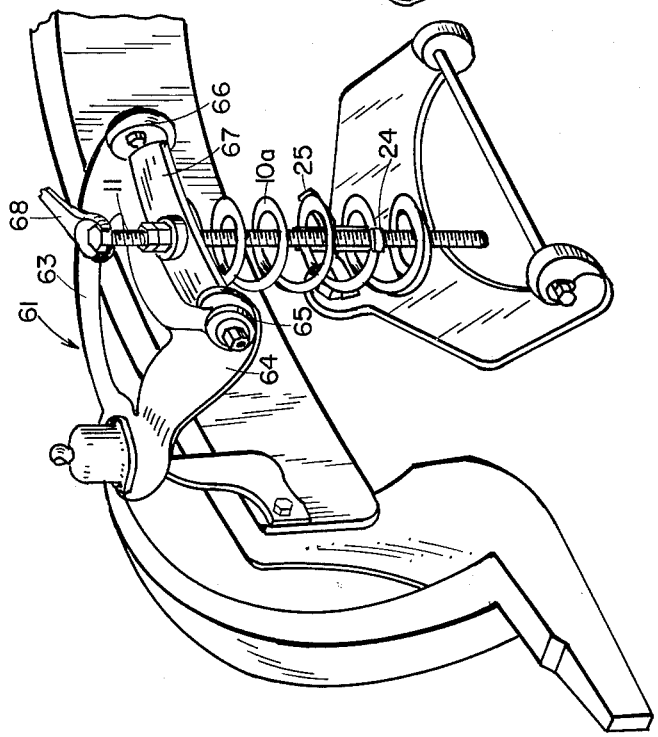
INVENTOR.
Joseph H. MacKay
BY
Maxwell E. Sparrow
ATTORNEY.

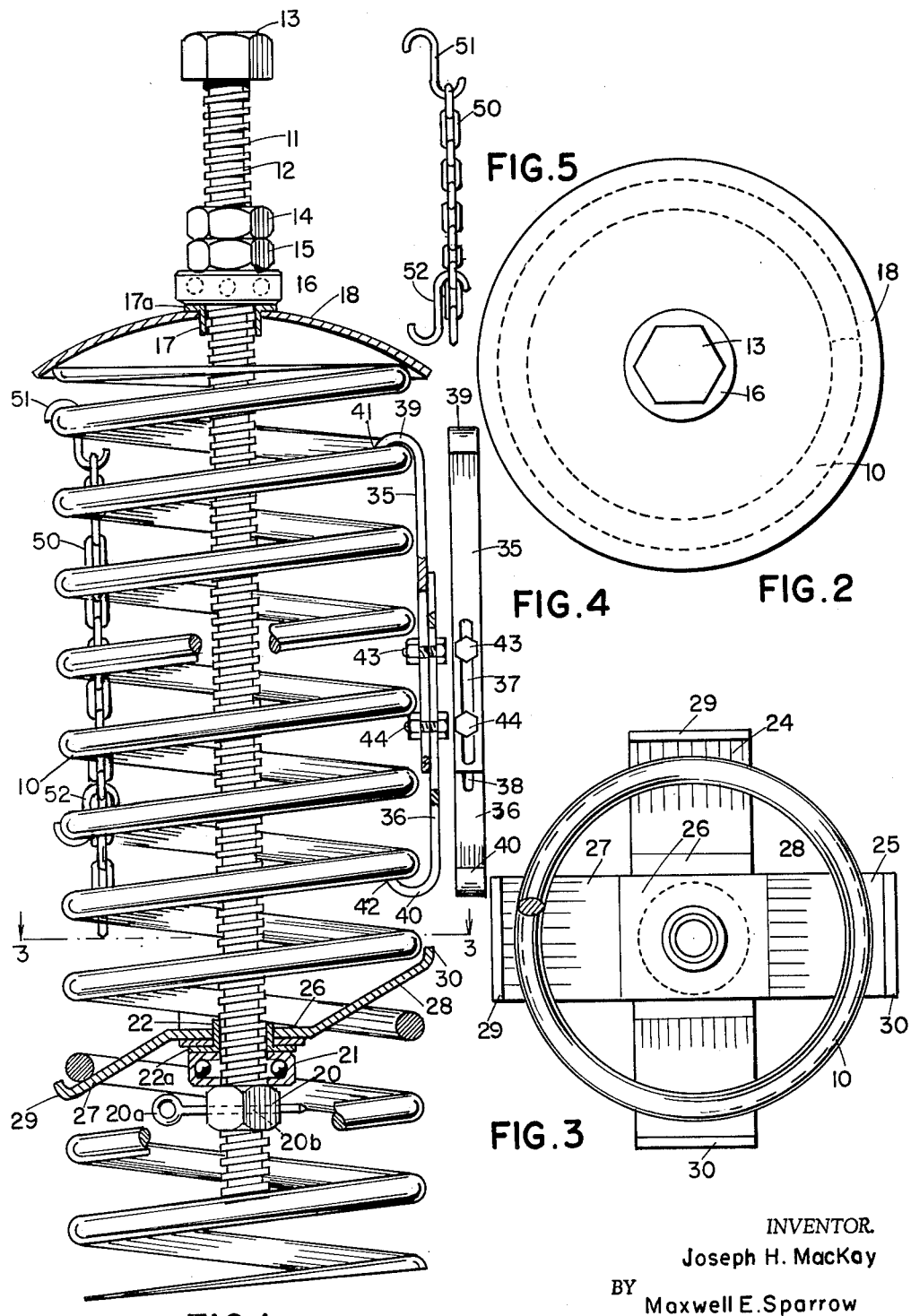

United States Patent Office 3,237,919
Patented Mar. 1, 1966

3,237,919
COIL SPRING COMPRESSOR
Joseph H. MacKay, Flushing, N.Y., assignor of one-half to Mitchell Klupt, New York, N.Y.
Filed Nov. 20, 1961, Ser. No. 153,477
7 Claims. (Cl. 254—10.5)

This invention relates generally to novel improvements in apparatus or device for facilitating the insertion and withdrawal of coil compression springs and more particularly to coil springs conventionally employed in motor vehicles.

It is a prime object of the present invention to provide a very practical, efficient and economical device having relatively few parts whereby a coil spring of the type conventionally used in connection with shock absorbers or the like for motor vehicles may be readily and conveniently compressed for its removal, insertion or replacement.

The long-felt need for a device according to the invention becomes apparent and extremely important after viewing the heretofore used conventional methods and devices, which are complicated, unwieldly and hazardous in use and operation.

It is a general object of the present invention to provide a device for compressing coil springs.

It is a further object of the present invention to provide a device for compressing coil springs, such as the types used in automobiles, either completely or partially, or for compressing any portion of the spring and to maintain the same in position, fully or partially compressed, in order that the spring may be readily inserted into place or removed from its appropriate position for replacement thereof or repair or replacement of adjacent parts of the automobile otherwise inaccessible.

Another object of the present invention is to provide utility device comprising a coil spring compressor for use in connection with shock absorber coil springs in motor vehicles which will hold the spring in any position in order that a mechanic can remove any component of the knee action assembly without the pressure of the spring interfering with the work being performed on the knee action assembly; which can be used to hold the coil spring as an assembled unit to lower the control arm in order that all components of knee action can be assembled as one unit; and which will hold the coil spring when removed in partly or fully compressed condition, so that the coil spring can be held in a given position by clamp and the device then removed from the coil spring after it is replaced.

Still another object of the present invention is to provide a coil spring compressor for the aforementioned purposes or uses which can be used in an inverted position as conditions or expediency may require or exigencies demand.

Yet another object of the present invention is to provide a utility device which readily adapts itself for the foregoing uses and which will perform the aforementioned operations in a facile and non-hazardous manner with assurance of safety.

The above and other objects of the invention will appear as the description proceeds, it being understood, however, that it is not intended that the invention be limited to the exact details described herein which illustrate the producion of a satisfactory example of many which may be obtained as a result of the knowledge gained through or gleaned from an understanding of the invention; and it is further intended that there be included as part of the invention all such obvious changes and modifications thereof as would occur to a person skilled in the art to which this invention pertains and as would fall within the scope of the claims appended hereto.

In the drawings:
FIG. 1 is a front elevational view of a device according to the invention being applied to a compression coil spring;
FIG. 2 is a top plan view of FIG. 1;
FIG. 3 is a sectional view taken through 3—3 of FIG. 1, looking in the direction of arrows;
FIG. 4 is a front view of a clamp or retainer according to an embodiment of the invention for holding convolutions of the spring in a state of compression;
FIG. 5 is a front view of a clamp or retainer according to another embodiment of the invention;
FIG. 6 is a perspective view of the knee action assembly of an automobile with shock absorber removed and coil spring compressor device being applied to the coil spring; and
FIG. 7 is a view showing the coil spring maintained in a state of compression.

In general, the invention, in one of its aspects, an example of which is depicted in the drawings, is a device to hold or contain a compression coil spring on a vehicle so that when a mechanic is working on the parts around the spring, it is not necessary to remove the spring; or the coil spring can be compressed by turning a threaded shaft, the coil spring being wholly or partially contained between end units, at least one of which units being in threaded engagement with the shaft so that as the threaded shaft is rotated or turned, the said one unit is drawn inward, compressing the coil spring as it moves. If it is necessary to remove the coil spring, this can be done with facility after the coil spring has been sufficiently compressed, making removal and, of course, replacement safer and easier.

Referring now more particularly to the drawings, FIG. 1 illustrates an embodiment of the invention as applied to a compression coil spring 10 in which it is desired to compress at least some of the turns or convolutions of the spring. It is understood, however, that if desired, all of the convolutions may be compressed with the device, according to the invention. It is desired to compress coil spring 10 for installation in an automobile.

According to the embodiment depicted in FIG. 1, a threaded elongated shaft 11 having preferably "Acme" type threads 12 is provided, which is adapted to extend into the central openings or passage of coil spring 10. At one end of shaft 11 there is fixed a head or nut 13 which is prevented from turning with relation to shaft 11 by being welded or otherwise secured thereto. Spaced along the shaft from head 13 are a pair of engaging nuts 14, 15, one of which functions as a lock nut. In engagement with nut 15 is a thrust ball bearing member 16. Either secured to or bearing against member 16 is a thread protective collar or flanged sleeve 17 against the flange 17a of which bears a dome- or cup-shaped member 18. Member 18 is preferably so shaped in order to facilitate centering of spring 10 against which it abuts at one end. It is to be understood that member 18 may be secured to collar 17.

In proximity to or spaced from the other end of threaded shaft 11 and in engagement therewith is a nut 20. Extending through holes in nut 20, as well as in shaft 11, is a removable pin 20a which locks nut 20 to shaft 11. Bearing against nut 20 is a thrust ball bearing member 21 which is in arrangement with a collar or flanged sleeve 22 similar to member 17. Seated on the flange 22a of member 22 in crosswise fashion are the supports or abutments 24, 25 for coil spring 10 by engagement with respective coils or convolutions.

Each member or abutment 24, 25 comprises a slightly raised flat central portion 26, which engage each other when the members 24, 25 are in superimposed position, and opposed angularly extending arms 27, 28, preferably disposed at 30 degree angles with respect to horizontal planes, arm 27 sloping downward and arm 28 sloping upward, as shown in FIG. 7. Arms 27, 28 have bent or hooked ends 29, 30 in order to confine therebetween respective coils of the spring 10 when the latter is compressed.

It is apparent that by rotating or turning shaft 11 relative to members 14, 15 by engaging head 13 with a wrench or other suitable tool, the effective portion of shaft 11, that is the shaft portion between inverted cup- or dome-shaped member 18 and abutment members 24, 25 will diminish, thus causing coil spring 10 to compress, in which case the convolutions between dome-shaped retainer 18 and abutments or supports 24, 25 will be retracted. Retraction of the convolutions of the coil spring or compression of the coil spring may also be accomplished by unloosening lock nut 14 and rotating nut 15 relative to threaded shaft 11; or by withdrawing pin 20a and turning nut 20 relative to threaded shaft 20; furthermore, the coil spring compressor device may be reversed, that is, the threaded shaft 11 with its upper assembly may be inserted from the bottom of the coil spring, all as expediency may dictate.

Any desired number of turns or convolutions of coil spring 10 may be maintained in retracted position by means of a clamp or other suitable instrumentality. FIGS. 4 and 5 of the drawings shown two such means. FIG. 4 disclosed a clamp or retainer comprising a pair of bars or arms 35, 36 provided with respective longitudinal slots 37, 38 adjacent one of their respective ends. The bars or arms 35, 36 are formed at their respective other ends with hooks 39, 40 for engagement with convolutions of coil spring 10, for example, 41, 42. After coil spring 10 has been compressed as heretofore explained, the clamp members 35, 36 with their end portions in overlying position and their hooks 39, 40 engaging convolutions 41, 42, are secured together by means of the nut and bolt assemblies 43, 44, or other suitable means. With the clamp holding the convolutions in retracted position, pin 20a is removed, nut 20 unthreaded from shaft 11, the assembly comprising abutments 24, 25, collar 22 and thrust bearing 21 removed from shaft 11, and shaft 11 carrying the parts 14–18 then removed. Thus, coil spring 10 in its partially compressed condition (see FIG. 7) may may be inserted into position in the motor vehicle or other appropriate device. It is readily understood that the clamp may be expanded to include under contraction any number or all of the convolutions of the coil spring.

FIG. 5 discloses a clamp comprising a chain 50 composed of a number of links and a pair of S-shaped hooks 51, 52. It is quite apparent that the distance between the hooks may be varied for engagement of desired convolutions or turns of the coil spring by changing the position of one of the hooks along the chain 50.

FIG. 6 discloses the application of the coil spring compressor device to a coil spring already in position in a portion of a motor vehicle containing a shock absorber, the shock absorber having first been removed. It might be necessary to compress the coil spring for repairment or replacement of knee action assembly parts adjacent the shock absorber or for removal of the coil spring for replacement, in which case the coil spring compressor device may be applied in a manner somewhat similar to that heretofore stated. However, it might not be necessary to use all of the compressor parts. For example, the dome-shaped cup 18 may be eliminated since a bearing surface is already provided by the knee action assembly (FIG. 6).

Referring to FIG. 6, there is disclosed a conventional knee action assembly for an automobile generally indicated by the numeral 60 having an upper control arm 61 and a lower control arm 62. Upper control arm 61 has a pair of arms 63, 64 to which is connected by means of ball joints 65, 66 a link 67 having the conventional hole 67a. The shock absorber has ben removed from within the coil spring 10a. It is desired to compress coil spring 10a for either replacement or for repairment of parts. The coil spring 10a is seated on a rest 69 having an opening 69a. The shaft 11 of the coil spring compressor device is inserted through hole 67a and the coil abutment members 24, 25 are inserted through convolutions of spring 10 and are threadedly made to engage convolutions of coil spring 10a. Then by means of wrench 68, threaded shaft 11 is rotated, thus compressing the coil spring 10a in the manner heretofore described.

Since coil spring 10a is now in a compressed state, access may be readily had to various parts of the knee action assembly for repair or replacement of parts. If it is desired to remove coil spring 10a for repair or replacement, then the clamp members or arms 35, 36, by means of their hooked ends 39, 40, are made to engage the compressed coil spring, adjusted and tightened so as to maintain the spring convolutions therebetween in retracted position. Then shaft 11 is removed from the center opening of the spring. The coil spring 10a, in its compressed state, may now be removed from the knee action assembly.

It is understood that the clamp unit 35, 36 or 50, 51, 52 may be hooked to the convolutions from the inside of the coil spring. FIG. 1 demonstrates the attachment of clamp unit 50, 51, 52 in such position. This may be necessary in the event an obstruction prevents the attachment of the clamp units from the outside of the coil spring.

It is further understood that if found necessary or convenient, the dome-shaped cup 18 may be used in an inverted position.

Although the drawings and the above specification disclose the best mode in which I have contemplated embodying my invention, I desire in no way to be limited to details of such disclosure, for in the further practical application of my invention many changes in the form and proportion may be made as circumstances require or experience suggests without departing from the spirit of the invention within the scope of the appended claims.

I claim:

1. A coil spring compressor comprising a threaded shaft means for holding a coil spring in position with said shaft extending longitudinally within said coil spring, said means comprising spaced elements mounted on said shaft and adapted to engage convolutions of said springs, one of said elements comprising a substantially hollow dome-shaped member, having a concave portion, said portion engaging the convolutions of one end of said spring, second means threadedly engaging said shaft and disposed with relation thereto, said second means freely rotatably supporting said spaced elements whereby rotation of said shaft reduces the distance between said elements thereby retracting said convolutions, and third means for retaining said convolutions in retracted position when said shaft and said first mentioned means are removed from said spring.

2. A coil spring compressor comprising a threaded shaft means for holding a coil spring in position with said shaft extending longitudinally within said coil spring, coil engaging means on said shaft means, said engaging means comprising two pairs of flat bars extending upwardly and downwardly, respectively, at an angle of substantially thirty degrees, said engaging means being adapted to engage convolutions of said spring, hollow dome-shaped means spaced apart from said engaging means, said hollow dome-shaped means having a concave portion, said portion engaging the convolutions of one end of said spring, means threadedly engaging said shaft for freely rotatably supporting both said hollow dome-shaped means and said coil engaging means and disposed with relation thereto whereby rotation of said shaft compresses said spring, and means for retaining convolutions of said spring in retracted position when said spring is compressed and when said shaft and said first mentioned means are removed from said spring.

3. A coil spring compressor comprising a threaded shaft means for holding a coil spring in position with said shaft extending longitudinally within said coil spring, said means comprising a first element mounted on said shaft and adapted to engage convolutions of said spring, and a substantially hollow dome-shaped element having a concave inner shape, said dome-shaped element mounted on said shaft and adapted to engage one end of said spring for containing same, means threadedly engaging said shaft and disposed with relation thereto whereby rotation of said shaft retracts convolutions of said spring upon engagement of said elements, and means for retaining convolutions of said spring in retracted position when said shaft and said elements are removed from said spring.

4. A coil spring compressor, according to claim 3, wherein said first element comprises flat bar cross members having both downwardly and upwardly turned engaging ends to compensate for the lead of the convolutions of said coil spring, said cross members having registering openings for reception of said threaded shaft.

5. Coil spring compressor, according to claim 4, wherein said members are separable.

6. Coil spring compressor, according to claim 3, wherein said means for retaining convolutions of said spring in retracted position when said shaft and said device are removed from said spring comprises a pair of engaging slotted arms, means to lock said arms in position, said arms having their free ends turned.

7. Coil spring compressor, according to claim 3, wherein said means for retaining convolutions of said spring in retracted position when said shaft and said device are removed from said spring comprises a linkage device and members adapted to grip convolutions of said coil spring.

References Cited by the Examiner

UNITED STATES PATENTS

| | | | |
|---|---|---|---|
| 1,114,601 | 10/1914 | Gerderes | 254—10.5 X |
| 1,389,657 | 9/1921 | Harsley et al. | 254—10.5 X |
| 1,449,551 | 3/1923 | Rock | 254—10.5 X |
| 1,459,692 | 6/1923 | Prescott | 29—219 |
| 1,525,174 | 2/1925 | England | 29—215 |
| 2,721,376 | 10/1955 | Showman | 254—10.5 X |
| 3,051,443 | 8/1962 | Castoe | 254—10.5 |
| 3,067,500 | 12/1962 | Bliss | 29—227 |
| 3,087,706 | 4/1963 | Van Der Wilt | 254—10.5 |

FOREIGN PATENTS 426,777    4/1935    Great Britain.

WILLIAM FELDMAN, *Primary Examiner.*

HARRISON R. MOSELEY, MILTON S. MEHR,
*Examiners.*